United States Patent
Tasaka et al.

(10) Patent No.: US 10,591,053 B2
(45) Date of Patent: Mar. 17, 2020

(54) FAIL DETERMINATION DEVICE FOR VEHICLE AUTOMATIC TRANSMISSIONS AND CONTROL DEVICE FOR VEHICLE AUTOMATIC TRANSMISSIONS

(71) Applicants: JATCO Ltd, Fuji-shi, Shizuoka (JP); NISSAN MOTOR CO., LTD., Yokohama-shi, Kanagawa (JP)

(72) Inventors: Hajime Tasaka, Seoul (KR); Youji Itou, Sagamihara (JP); Masahiro Hamano, Atsugi (JP); Naonori Iizuka, Fuji (JP); Norihira Amano, Fuji (JP); Heo Chang Moo, Bu Cheon (KR)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 184 days.

(21) Appl. No.: 15/560,683

(22) PCT Filed: Feb. 17, 2016

(86) PCT No.: PCT/JP2016/054536
§ 371 (c)(1),
(2) Date: Sep. 22, 2017

(87) PCT Pub. No.: WO2016/152329
PCT Pub. Date: Sep. 29, 2016

(65) Prior Publication Data
US 2018/0106368 A1   Apr. 19, 2018

(30) Foreign Application Priority Data

Mar. 23, 2015 (JP) .................................. 2015-059729

(51) Int. Cl.
*F16H 61/12* (2010.01)
*B60W 50/04* (2006.01)
(Continued)

(52) U.S. Cl.
CPC ......... *F16H 61/12* (2013.01); *B60W 50/0205* (2013.01); *B60W 50/04* (2013.01);
(Continued)

(58) Field of Classification Search
CPC .............. F16H 61/12; F16H 61/66236; F16H 61/0213; F16H 61/02; F16H 59/68;
(Continued)

(56) References Cited

U.S. PATENT DOCUMENTS 5,272,441 A * 12/1993 Wright et al. .......... F16H 61/12
324/546
5,609,067 A * 3/1997 Mitchell et al. ........ F16H 61/12
74/336 R
(Continued)

FOREIGN PATENT DOCUMENTS

EP          0 517 422 A2    12/1992
EP          1 022 494 A2     7/2000
(Continued)

*Primary Examiner* — Dale W Hilgendorf
(74) *Attorney, Agent, or Firm* — Foley & Lardner LLP

(57) ABSTRACT

A failure judgment device of an automatic transmission includes: a first abnormality judging section configured to judge a power supply fault abnormality or a breaking abnormality of the solenoid, from a selected shift stage and a state of the transmission mechanism, after the detection of the electric abnormality; and a second abnormality judging section configured to judge the power supply abnormality or the breaking abnormality of the solenoid, from the monitor current value when the solenoid valve is switched to an OFF state, after the detection of the electric abnormality, when one of the first abnormality judging section and the second abnormality judging section judges the power supply fault abnormality or the breaking abnormality, the judgement result being outputted.

10 Claims, 6 Drawing Sheets

(51) Int. Cl.
*B60W 50/02* (2012.01)
*F16H 59/68* (2006.01)
*F16H 61/02* (2006.01)
*F16H 61/662* (2006.01)
*F16H 59/70* (2006.01)

(52) U.S. Cl.
CPC .......... *B60W 50/045* (2013.01); *F16H 59/68* (2013.01); *F16H 61/02* (2013.01); *F16H 61/0213* (2013.01); *F16H 61/66236* (2013.01); *B60W 2050/021* (2013.01); *B60W 2050/022* (2013.01); *F16H 2059/704* (2013.01); *F16H 2059/706* (2013.01); *F16H 2061/1208* (2013.01); *F16H 2061/1268* (2013.01); *F16H 2061/1288* (2013.01); *F16H 2061/1292* (2013.01)

(58) Field of Classification Search
CPC ....... F16H 2061/1208; F16H 2059/706; F16H 2059/704; F16H 2061/1268; F16H 2061/1292; F16H 2061/1288; B60W 50/045; B60W 50/04; B60W 50/0205; B60W 2050/022; B60W 2050/021
See application file for complete search history.

(56) References Cited

U.S. PATENT DOCUMENTS

| | | | |
|---|---|---|---|
| 6,307,376 B1* | 10/2001 | Alexander et al. | F16H 61/12 324/388 |
| 7,513,850 B2* | 4/2009 | Yoneyama | F16H 1/12 477/80 |
| 8,032,274 B2* | 10/2011 | Niwa et al. | F16H 1/12 701/31.8 |
| 10,000,205 B2* | 6/2018 | Koshiba et al. | B60W 2050/022 |
| 2010/0076637 A1 | 3/2010 | Ueoka | |

FOREIGN PATENT DOCUMENTS

| | | |
|---|---|---|
| EP | 2 049 820 | 4/2009 |
| JP | H08-240263 A | 9/1996 |
| JP | H11-280882 A | 10/1999 |
| JP | 2003-097692 A | 4/2003 |
| JP | 3842465 B2 | 11/2006 |
| JP | 2008-167540 A | 7/2008 |
| JP | 2008-207651 A | 9/2008 |
| WO | WO-2006/079392 A2 | 8/2006 |

* cited by examiner

FAIL DETERMINATION DEVICE FOR VEHICLE AUTOMATIC TRANSMISSIONS AND CONTROL DEVICE FOR VEHICLE AUTOMATIC TRANSMISSIONS

TECHNICAL FIELD

This invention relates to a failure judgment device for an automatic transmission of a vehicle, and a control device for the automatic transmission of the vehicle to which the failure judgment device is provided.

BACKGROUND ART

In an automatic transmission for a vehicle, a shift valve is normally a solenoid valve. The shift valve is switched by operating the solenoid so as to engage or disengage frictional engagement elements. With this, a shift stage is switched. In this automatic transmission, when a failure is generated in the shift valve, the selected shift stage is not attained. Accordingly, when the generation of the failure is sensed, a control (failsafe control) to suppress the failure influence is performed. Besides, it is necessary to identify causes of the failure for performing appropriate failsafe control.

In a patent document 1, the gear ratio deviation is sensed from the selected shift stage, and the sensed actual gear ratio. Moreover, when the shift valve which is failed, and which is presumed to be the cause of the gear deviation can be presumed, the solenoid configured to control the actuation of the presumed shift valve is forcibly switched to the OFF state during the predetermined time period. It is checked whether or not that cause is the failure of the solenoid. When the failure of the solenoid is confirmed, it is possible to perform the failsafe control according to that.

PRIOR ART DOCUMENT

Patent Document

Patent Document 1: Japanese Patent Application Publication No. 2003-97692

SUMMARY OF THE INVENTION

Problems which the Invention is Intended to Solve

However, in the art of the patent document 1, when the gear deviation is sensed, it is checked whether or not the cause of the failure of the shift valve which is the cause of the gear ratio deviation is the failure of the solenoid. Accordingly, it is necessary to sense the gear ratio deviation. For example, in a case where the gear ratio deviation is not sensed at the stop of the vehicle and so on, the failure cannot be sensed.

Moreover, when the failure of the shift valve is sensed, it is checked whether or not the cause of the failure of the shift valve is the failure of the solenoid. However, it is not checked what type of the failure is generated. For example, the failure of the solenoid includes a failure in which the electric power supply line to the solenoid is a ground fault (short-circuited to the ground), a failure in which the electric power supply line to the solenoid is a power supply fault (short-circuited to the power supply), and a breaking (disconnection). If these failures are confirmed, it is possible to perform appropriate failsafe control.

It is, therefore, an objection of the present invention to provide a failure judgment device of an automatic transmission for a vehicle, and a control device of the automatic transmission of the vehicle which includes the failure judgment device that are arranged to sense a failure of a solenoid of a shift valve when a gear ratio deviation is not sensed, and to identify the type of the failure of the solenoid.

Means for Solving the Problem (1) For attaining the above-described objects, a failure judgment device for an automatic transmission of an vehicle according to the present invention which includes a transmission mechanism including a frictional engagement element arranged to be engaged in accordance with a selected shift stage, a solenoid valve arranged to control an engagement state of the frictional engagement element, the failure judgment device comprising: a monitoring means configured to monitor a current value supplied to the solenoid valve; an electric abnormality sensing means configured to sense a generation of an electric abnormality the solenoid valve from the monitor current value of the monitoring means which is different from a command current value to the solenoid valve; a first abnormality judging means configured to judge a power supply fault abnormality or a breaking abnormality of the solenoid, from a selected shift stage and a state of the transmission mechanism, after the detection of the electric abnormality; and a second abnormality judging means configured to judge the power supply abnormality or the breaking abnormality of the solenoid, from the monitor current value when the solenoid valve is switched to an OFF state, after the detection of the electric abnormality, when one of the first abnormality judging means and the second abnormality judging means judges the power supply fault abnormality or the breaking abnormality, the judgement result being outputted.

(2) It is preferable that the second abnormality judging means is configured to start the judgment operation of the power supply fault abnormality or the breaking abnormality the solenoid valve after a predetermined time period necessary for the judgment of the first abnormality judging means is elapsed from the detection of the electric abnormality.

(3) It is preferable that the first abnormality judging means is configured to judge the power supply fault abnormality or the breaking abnormality of the one of the plurality of the solenoid valves, from a gear ratio deviation between an actual gear ratio and a gear ratio by a shift stage commanded to the transmission mechanism.

(4) It is preferable that the automatic transmission includes a plurality of solenoid valves; the first abnormality judging means is configured to judge whether one of the plurality of the solenoid valves is the power supply fault abnormality or the breaking abnormality when the transmission mechanism is brought to a neutral state during a vehicle stop when a traveling range is selected; and the first abnormality judging means is configured to judge whether or not the other of the plurality of the solenoid valves is the power supply fault abnormality or the breaking when the transmission mechanism is brought to an interlocking state during the vehicle is traveling.

(5) It is preferable that the failure judgment device includes a ground fault abnormality judging means configured to judge that one of the solenoid valves is a ground fault abnormality when the monitor current value is equal to or greater than a predetermined current value when the electric abnormality is sensed, and to judge whether or not the solenoid valve is the power supply fault abnormality or the breaking abnormality when the monitor current value is smaller than the predetermined current value when the electric abnormality is sensed; and the first abnormality judging means and the second abnormality judging means are configured to judge the power supply fault abnormality or the breaking abnormality when the ground fault abnormality judging means judges the power supply fault abnormality or the breaking abnormality.

(6) A control device for an automatic transmission of a vehicle which includes a transmission mechanism including frictional engagement element arranged to be engaged in accordance with a selected shift stage, and a solenoid valve arranged to control the engagement state of the frictional engagement element, the control device comprising: the failure judgment device; and a control means configured to perform a failsafe of the solenoid valve in accordance with a judgment result of the failure judgment device.

Benefit of the Invention

In the present invention, the abnormality judgments of the first abnormality judging means and the second abnormality judging means are performed in a parallel manner after the detection of the electric abnormality. The first abnormality judging means judges from the selected shift stage, and the state of the transmission mechanism (for example, the generation of the gear ratio deviation). Accordingly, the first abnormality judging section cannot judge for the selected shift stage, and the state of the transmission mechanism (for example, a case where the gear ratio deviation is not generation). The second abnormality judging means configured to electrically judge the abnormality performs the judgment, irrespective of the state of the transmission mechanism (for example, the existence of the gear ratio deviation). Accordingly, the chance of the judgment is increased.

The end of the judgment of the first abnormality judging means may be earlier than the end of the judgment of the second abnormality judging means. Accordingly, it is possible to rapidly start the failsafe control based on the fail judgment result, by outputting earlier one of the failure judgment result.

In this way, the demerits of the first and second abnormality judging means are complemented by the merits of the first and second abnormality judging means, by using the two abnormality judging means.

BRIEF DESCRIPTION OF DRAWINGS

FIG. 2(a) shows a normal state. FIG. 2(b) shows a breaking state. FIG. 2(c) shows a power supply fault.

DESCRIPTION OF EMBODIMENTS

Hereinafter, one embodiment according to the present invention is explained with reference to the drawings. In this embodiment, an automatic transmission including frictional engagement elements arranged to be engaged and disengaged by operations of solenoid valves is a stepped auxiliary transmission mechanism provided on an output side of a belt type continuously variable transmission (referred also merely to CVT). Besides, a rotation speed is represented as a rotation number (that is, a number of rotation per unit time).

[1. Configuration of Driving System of Vehicle]

Figure 1:
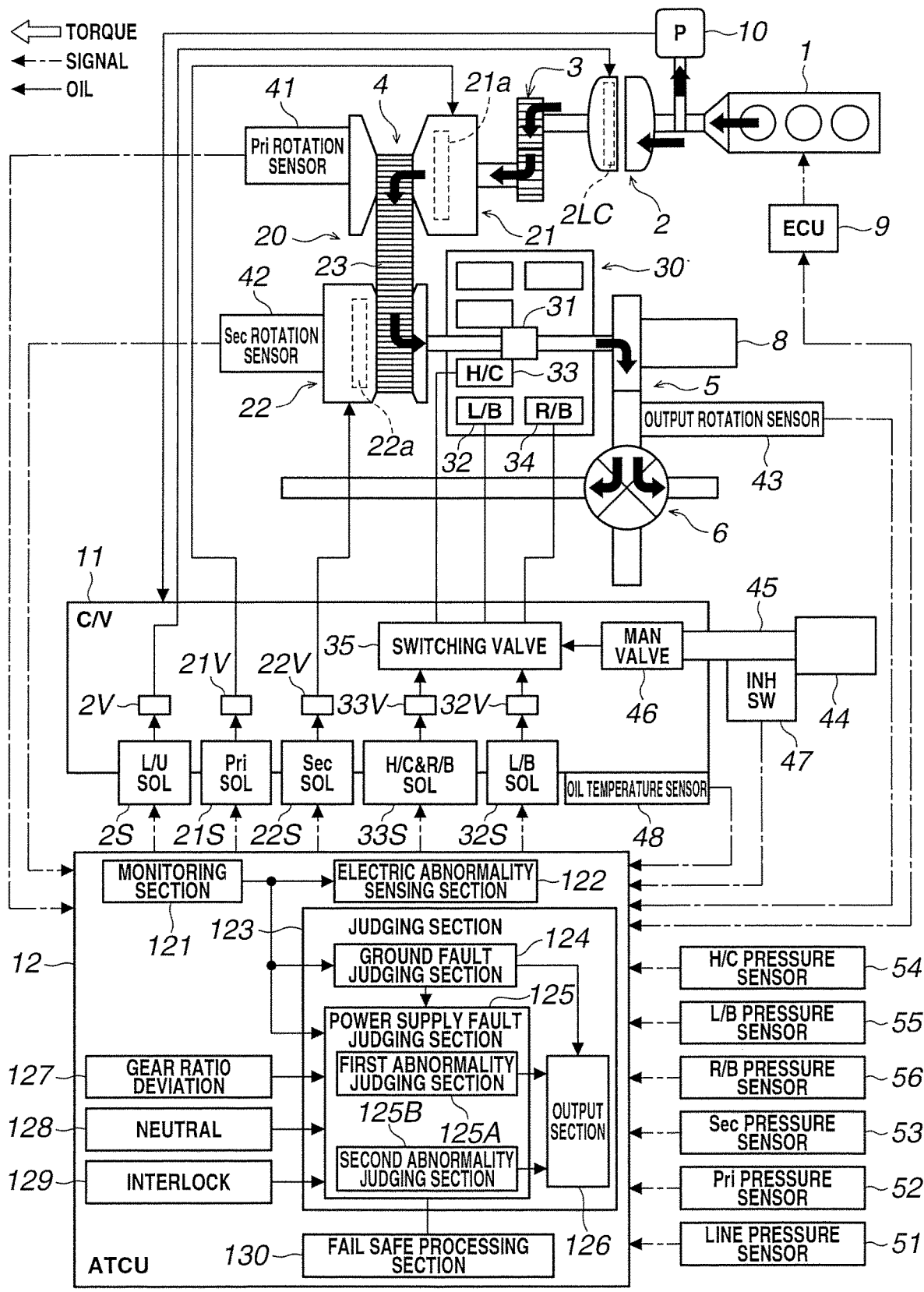
FIG. 1 is a configuration view showing a driving system of a vehicle on which an automatic transmission for a vehicle, and a control device including a failure judgment device in one embodiment are mounted.

FIG. 1 is a configuration view showing a driving system of a vehicle on which a vehicular automatic transmission and a control device including a failure judgment device for the automatic transmission in this embodiment are mounted.

As shown in FIG. 1, this vehicle includes an engine 1 serving as a power source. An output rotation of the engine 1 is transmitted through a torque converter 2 with a lockup clutch, a gear row (a driving counter gear and a driven counter gear) 3, a continuously variable transmission (hereinafter, referred to merely as a transmission) 4, a final speed reduction gear 5, and a differential mechanism 6 to driving wheels (not shown). A parking mechanism 8 is provided to the final speed reduction gear 5. The parking mechanism 8 is arranged to mechanically lock an output shaft of the transmission 4 at a vehicle stop so as not to rotate the output shaft.

This vehicle includes an oil pump 10 arranged to be driven by using a part of the power of the engine 1; a control valve unit (C/V, a hydraulic control circuit) 11 arranged to regulate a hydraulic pressure from the oil pump 10, and to supply this hydraulic pressure to various parts of the transmission 4; and an automatic transmission control unit (ATCU) 12 configured to control the control valve unit 11.

These configurations are explained. In the transmission 4, the belt continuously variable transmission (referred to also merely as the CVT) 20 and the auxiliary transmission mechanism 30 are provided in series with each other in a power transmitting path from the engine 1 to the driving wheels.

The CVT 20 includes a primary pulley 21, a secondary pulley 22, and a V belt wound around these pulleys 21 and 22.

The pulleys 21 and 22 include, respectively, fixed sheaves; movable sheaves each disposed in a state where a sheave surface confronts the fixed sheave to form a V groove between the fixed sheave and the movable sheave; and hydraulic pressure cylinders 21a and 22a provided on back surfaces of the movable sheaves, and arranged to displace the movable sheaves in axial directions.

The widths of the V grooves are varied by adjusting the hydraulic pressures supplied to the hydraulic pressure cylinders 21a and 22a, so that contact radii of the V belt 23 with the pulleys 21 and 22 are varied. With this, a transmission gear ratio Ratio of the CVT 20 is continuously varied.

Accordingly, the control valve unit 11 includes a primary valve 21V and a secondary valve 22V arranged to supply the hydraulic pressures, respectively, to the hydraulic pressure cylinder 21a of the primary pulley 21 and the hydraulic pressure cylinder 22a of the secondary pulley 22.

Each of the primary valve 21V and the secondary valve 22 V is a solenoid valve. The primary valve 21V is driven by a primary solenoid (Pri SOL) 21S. The secondary valve 22V is driven by a secondary solenoid (Sec SOL) 22S.

The auxiliary transmission mechanism 30 is a transmission mechanism having two forward shift stages and a reverse shift stage. The auxiliary transmission mechanism 30 includes a Ravigneaux type planetary gear mechanism 31 in which carriers of two planetary gears are connected; and a plurality of frictional engagement elements [a low brake (L/B) 32, a high clutch (H/C) 33, a reverse brake (R/C) 34] which are connected to a plurality of rotational elements constituting the Ravigneaux type planetary gear mechanism 31, and which are arranged to vary link states of the rotational elements of the Ravigneaux type planetary gear mechanism 31.

The auxiliary transmission mechanism 30 is arranged to select the shift stages of a first forward speed (Low), a second forward speed (High), and a reverse, and a neutral by combination of engagement (○) and disengagement (x) of the low brake (L/B) 32, the high clutch (H/C) 33, and the reverse brake (R/B) 34 shown in a following table 1.

TABLE 1

|  | L/B | H/C | R/B |
|---|---|---|---|
| First Speed | ○ | x | x |
| Second Speed | x | ○ | x |
| Reverse | x | x | ○ |
| Neutral | x | x | x |

That is, in a case where all of the low brake (L/B) 32, the high clutch (H/C) 33, and the reverse brake (R/B) 34 are disengaged, the auxiliary transmission mechanism 30 becomes a neutral state in which the power is not transmitted. When the low brake (L/B) 32 is engaged in this state, the auxiliary transmission mechanism 30 becomes a state where the first forward speed is selected (speed reduction). When the high clutch (H/C) 33 is engaged in the above-described state, the auxiliary transmission mechanism 30 becomes a state where the second forward speed is selected (a direct connection). When the reverse brake (R/B) 34 is engaged in the above-described state, the auxiliary transmission mechanism 30 becomes a state in which the reverse is selected (reverse).

The control valve unit 11 includes a low brake valve 32V which is a select valve arranged to supply the hydraulic pressure for the engagement to the low brake 32; and a high clutch/reverse brake valve 33V which is a select valve arranged to supply the hydraulic pressures for the engagements to the high clutch 33 and the reverse brake 34.

Each of the low brake valve 32V and the high clutch/reverse brake valve 33V is a solenoid valve. The low brake valve 32V is driven by a low brake solenoid (L/B SOL) 32S. The high clutch/reverse brake valve 33V is driven by a high clutch/reverse brake solenoid (H/C & R/B SOL) 33S.

Moreover, the control valve unit 11 includes a lockup valve 2V arranged to supply the hydraulic pressure for the engagement to a lockup clutch 2LC of the torque converter 2. This lockup valve 2V is also a solenoid valve. The lockup valve 2V is driven by a lockup solenoid (L/U SOL) 2S.

ATCU 12 includes a CPU (not shown), a storage device (not shown) including a RAM/ROM, an input interface (not shown), an output interface (not shown), buses connecting these components, and so on.

The input interface receives, as output signals relating to the control valve unit 11, output signals from speed sensors of a primary rotation speed sensor 41 arranged to sense a rotation speed (primary pulley rotation speed Npri) of the primary pulley 21, a secondary rotation speed sensor 42 arranged to sense a rotation speed (secondary rotation speed Nsec) of the secondary pulley 22, and an output rotation sensor (vehicle speed sensor) 43 arranged to sense a rotation speed [output rotation speed corresponding to a traveling speed (vehicle speed Vsp) of the vehicle] which is inputted to the differential mechanism 6, and which is outputted to the driving wheels, an output signal from an inhibitor switch 47 arranged to sense a positon of a select lever, output signals from an oil temperature sensor 48, and oil pressure sensors of the line pressure sensor 51, the primary pressure sensor 52, the secondary pressure sensor 53, the high clutch pressure sensor 54, the low brake pressure sensor 55, and the reverse brake pressure sensor 56, an engine information from the engine control unit (ECU) 9 and so on.

The storage device stores a shift control program of the transmission 4, and a shift map (not shown) used by this shift control program. The CPU is configured to read the shift control program stored in the storage device, and to carry out the shift control program. The CPU is configured to produce a shift control signal by performing various calculation processing to the various signals inputted through the input interface, and to output the produced shift control signal through the output interface to the control valve unit 11. The various values used in the calculation processing by the CPU, and those calculation results are stored in the storage device.

The control valve unit 11 includes a plurality of flow passages, and the plurality of the hydraulic pressure regulating valves such as the solenoid valves 21S, 22S, 32S, 33S, and 2S. This control valve unit 11 is arranged to switch the supply paths of the hydraulic pressure by controlling the plurality of the hydraulic pressure regulating valves, based on the shift control signal from the ATCU 12. The control valve unit 11 is configured to adjust the necessary hydraulic pressure from the hydraulic pressure generated in the oil pump 10, and to supply this hydraulic pressure to the various portions of the transmission 4. With this, the transmission gear ratio Ratio of the CVT 20, and the shift stage of the auxiliary transmission mechanism 30 are varied to shift the transmission 4.

In the auxiliary transmission mechanism 30, the low brake solenoid 32S is arranged to supply the line pressure PL as the low brake pressure to the low brake 32 when the ATCU 12 outputs the first speed selection command, and thereby to engage the low brake 32 to attain the first speed selection command.

Moreover, the high clutch/reverse brake solenoid 33S is arranged to supply the line pressure PL to the switch valve 35 through the manual valve 46 arranged to be switched through the manual shaft 45 by the operation of the selection lever 44 when the ATCU 12 outputs the second speed selection command or the reverse selection command.

At the second speed selection command, the manual valve 46 is positioned at the forward traveling range. The switch valve 35 is switched to the supply to the high clutch so as to supply the high clutch pressure from the high clutch/reverse brake valve 33V to the high clutch 33 by the actuation of the high clutch/reverse brake solenoid 33S. With this, the high clutch 33 is engaged to attain the second speed selection command.

At the reverse speed selection command, the manual valve 46 is positioned at the reverse traveling range. The switch valve 35 is switched to the supply to the reverse brake so as to supply the reverse brake pressure from the high clutch/reverse brake solenoid 33V to the reverse brake 34 by the actuation of the high clutch/reverse brake solenoid 33S. With this, the reverse brake 34 is engaged to attain the reverse speed selection command.

[Failure Judgment Device and Control Device for Automatic Transmission (Continuously Variable Transmission)]

A failure judgment device and a control device including the failure judgment device in this embodiment are explained.

The failure judgment device according to this embodiment includes a monitoring section (monitoring means) 121 configured to monitor (electric) current states of the solenoid valves 32S and 33S of the auxiliary transmission mechanism 30; an electric abnormality sensing section (electric abnormality sensing means) 122 configured to sense electric abnormalities of the solenoid valves 32S and 33S from the information of the monitoring section 121; and a judging section (judging means) 123 configured to judge whether the electric abnormality of the solenoid valve 32S or the solenoid valve 33S in which the electric abnormality is sensed by the electric abnormality sensing section 122 is a ground fault (short-circuit to the ground), a power supply fault (short circuit to the power supply), or a breaking (disconnection).

The monitoring section 121, the electric abnormality sensing section 122, and the judging section 123 are constituted by hardware and software installed within the ATCU 12, and hardware provided to the ATCU 12. However, the monitoring section 121, the electric abnormality sensing section 122, and the judging section 123 may be constituted by other special hardware and software.

Figure 2:
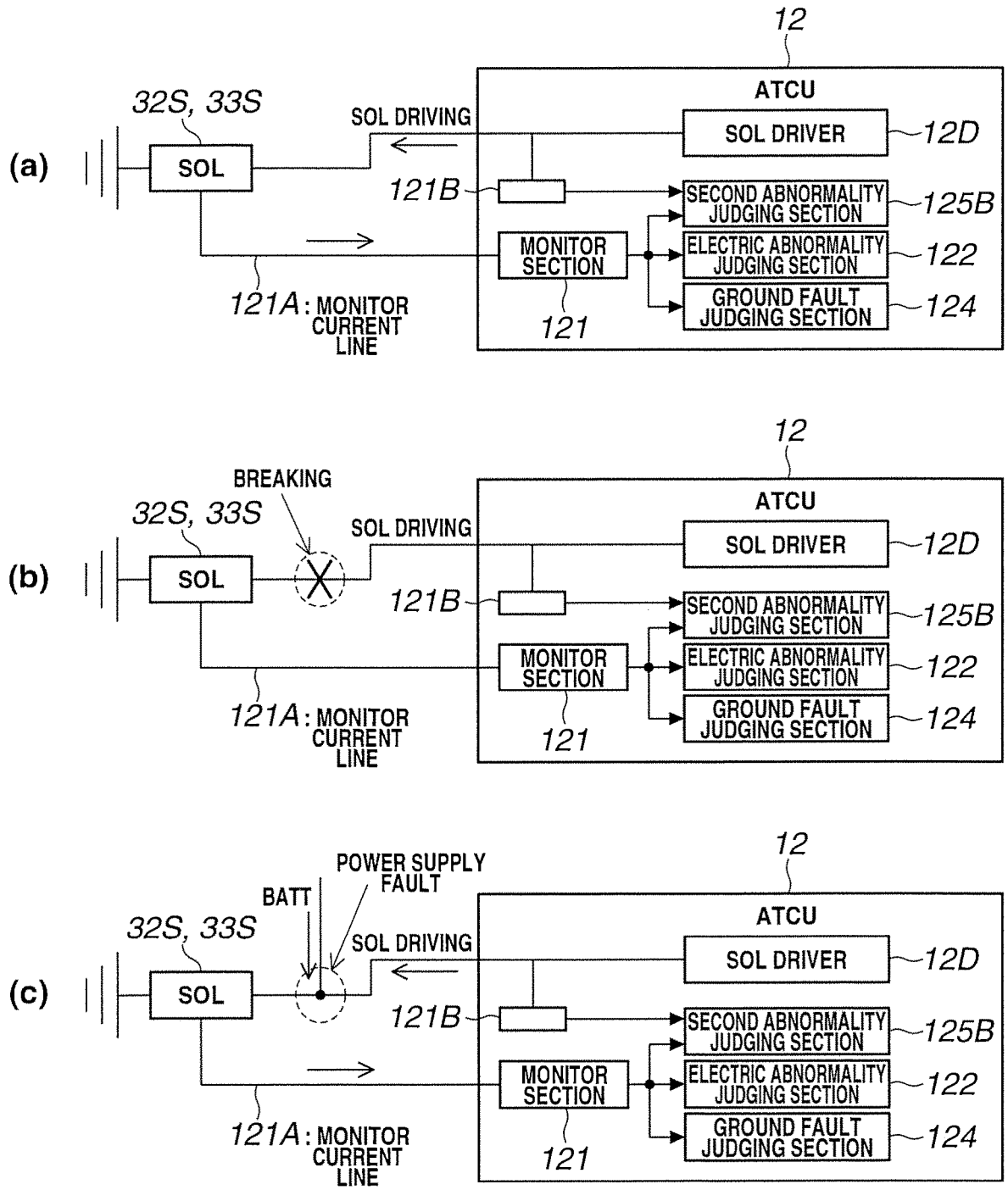
FIG. 2 show configuration views showing a second abnormality judging means of a failure judging device according to one embodiment of the present invention.

As shown in FIG. 2(a), solenoid drivers (SOL drivers) 12D are provided within the ATCU 12 for the respective solenoid valves. Each of the solenoid drivers 12D is configured to supply the electric power to the solenoid valve 32S or 33S, and so on. A monitor current line 121A is connected between each of the solenoid valves and the ATCU 12. Moreover, voltage monitor circuits 121B are provided within the ATCU 12 for the respective solenoid valves 12D. The voltage monitor circuits 121B are configured to check (confirm) the operations of the solenoid drivers 12D.

Each of the monitoring sections 121 is configured to constantly monitor a current value supplied to one of the solenoid valves 32S and 33S at one of the shift stages (the first speed or the second speed) of the auxiliary transmission mechanism 30, from the current information transmitted through the monitor current lines 121A.

The electric abnormality sensing section 122 is configured to compare the monitoring current value monitored in the monitoring section 121, and a command current value to the corresponding one of the solenoid valves 32S and 33S, and to determine that the electric abnormality is generated in the corresponding one of the solenoid valves 32S and 33S when a predetermined difference or more is generated between these current values.

The judging section 123 includes a ground fault judging section (ground fault judging means) 124 configured to judge whether or not the solenoid valve 32S or 33S in which the electric abnormality is sensed is the ground fault abnormality; and a power supply fault breaking judging section (power supply fault breaking judging means) 125 configured to judge whether that solenoid valve 32S or 33S is the power supply fault abnormality or the breaking abnormality when the ground fault judging section 124 determines that the solenoid valve 32S or 33S is not the ground fault abnormality [in this case, either of the power supply fault abnormality (short-circuit to the power supply) or the breaking abnormality].

However, in this failure judging device, the power supply fault breaking judging section 125 includes a first abnormality judging section (first abnormality judging means) 125A and a second abnormality judging section (second abnormality judging means) 125B. These first abnormality judging section 125A and second abnormality judging section 125B perform the judging processes in a parallel manner. When one of the abnormality judging sections 125A and 125B finishes the judgment, the output section 126 outputs the judgement information.

The ground fault judging section 124 is configured to judge that the overcurrent flows when the monitoring current value at the detection of the electric abnormality by the electric abnormality sensing section 122 is equal to or greater than a judgment reference value, and thereby to judge that the solenoid valve 32S or 33S in which the electric abnormality is sensed is the ground fault abnormality. Moreover, the ground fault judging section 124 is configured to judge that the solenoid valve 32S or 33S in which the electric abnormality is sensed is the power supply fault abnormality or the breaking abnormality when the monitoring current value is smaller than the judgment reference value.

The power supply breaking judging section 125 is configured to perform the judgment when the ground fault judging section 124 determines that the solenoid valve 32S or 33S in which the electric abnormality is sensed is one of the power supply fault abnormality or the breaking abnormality.

After the electric abnormality sensing section 122 senses the electric abnormality, that is, after the ground fault judging section 124 determines that the solenoid valve 32S or 33S in which the electric abnormality is sensed is the power supply abnormality or the breaking abnormality, the first abnormality judging section 125A judges whether the that solenoid valve 32S or 33S is the power supply fault abnormality or the breaking abnormality, based on the selected shift stage and the state of the auxiliary transmission mechanism 30. The states of the auxiliary transmission mechanism 30 are the neutral state or an interlocking state.

Besides, the gear ratio is calculated based on "the gear ratio=the input rotation/the output rotation". When the auxiliary transmission mechanism 30 becomes the neutral state or the interlocking state when the shift stage of the first speed or the second speed is commanded, the gear ratio deviation is generated. Moreover, in this embodiment, the gear ratio deviation is judged based on the calculation result of the gear ratio (the input and output rotation speed (number)). However, the gear ratio deviation may be judged by a calculation result of a difference between actual input and output rotation speeds (numbers).

That is, in the neutral state, the actual transmission gear ratio (the actual gear ratio) of the auxiliary transmission mechanism 30 is an undefined state. Accordingly, the gear ratio deviation is generated with respect to the transmission gear ratio (the commanded gear ratio) of the commanded shift stage (in this case, the first speed or the second speed).

In this case, "the interlocking state" is a state where the plurality of the frictional engagement elements of the transmission mechanism (in this embodiment, the low brake 32 and the high clutch 33) are simultaneously engaged. This engagement is a full engagement and a slip engagement.

In the interlocking state during the traveling of the vehicle, all of the plurality of the frictional engagement elements (the low brake 32 and the high clutch 33) are slip-engaged. Accordingly, the transmission mechanism becomes the intermediate shift unexpected state by the transmission gear ratio attained by the slip-engaged frictional engagement elements (the low brake 32 and the high clutch 33). Consequently, the gear ratio deviation is generated.

The first abnormality judging section 125A is configured to judge the neutral state or the interlocking state in accordance with whether the vehicle is traveling or stopped, and whether the electric abnormality is sensed in the low brake solenoid 33S or the high clutch/reverse brake solenoid 33S, and thereby to judge the power supply fault abnormality or the breaking abnormality.

Besides, in this case, the low brake valve 32V is a normally closed valve arranged to be closed (the hydraulic pressure supply stop) when the low brake solenoid 32S is not energized, and to increase an opening degree (the hydraulic pressure supply) in accordance with an energization amount when the low brake solenoid 32S is energized.

Moreover, in this case, the high clutch/reverse valve 33V is a normally open valve arranged to be opened (the hydraulic pressure supply) when the high clutch/reverse valve 33S is not energized, and to be closed by decreasing the opening degree in accordance with the energization amount when the high clutch/reverse solenoid 33S is energized.

Accordingly, when the low brake solenoid 32S is the breaking abnormality, the low brake valve 32V is constantly closed (the hydraulic pressure supply stop), so that the low brake 32 cannot be engaged. When the second speed is commanded, it is possible to attain the second speed. However, when the first speed is commanded, it is not possible to attain the first speed. Moreover, the auxiliary transmission mechanism 30 becomes the neutral state during the traveling of the vehicle and the vehicle stop.

Furthermore, when the low brake solenoid 32S is the power supply fault abnormality, the low brake valve 32V is constantly opened (the hydraulic pressure supply), so that the low brake 32 is constantly engaged. When the first speed is commanded, it is possible to attain the first speed. However, when the second speed is commanded, it is not possible to attain the second speed. Moreover, the auxiliary transmission mechanism 30 becomes the interlocking state, so that the gear ratio is deviated.

On the other hand, when the high clutch/reverse solenoid 33S is the breaking abnormality, the high clutch/reverse valve 33V is constantly opened (the hydraulic pressure supply), so that the high clutch 33 is constantly engaged. When the second speed is commanded, it is possible to attain the second speed. However, when the first speed is commanded, it is not possible to attain the first speed. At least one of the low brake 32 and the high clutch 33 becomes the slip engagement state during the traveling of the vehicle. The auxiliary transmission mechanism 30 becomes the gear ratio deviation state in which the commanded gear ratio (the gear ratio by the first speed) and the actual gear ratio are different from each other. The auxiliary transmission mechanism 30 becomes the interlocking state during the vehicle stop.

Moreover, when the high clutch/reverse solenoid 33S is the power supply fault abnormality, the high clutch/reverse valve 33V is constantly closed (the hydraulic pressure stop), so that the high clutch 33 cannot be engaged. When the first speed is commanded, it is possible to attain the first speed. However, when the second speed is commanded, it is not possible to attain the second speed. The auxiliary transmission mechanism 30 becomes the neutral state, so that the gear ratio is deviated.

In this way, in a case where the low brake solenoid 32S is the abnormality, the first abnormality judging section 125A is configured to determine that the low brake solenoid 32S is the breaking abnormality when the auxiliary transmission mechanism 30 is in the neutral state although the first speed is commanded, and to determine that the low brake solenoid 32S is the power supply abnormality when the auxiliary transmission mechanism 30 is in the interlocking state although the second speed is commanded.

Moreover, in a case where the high clutch/reverse solenoid 33S is the abnormality, the first abnormality judging section 125A is configured to determine that the high clutch/reverse solenoid 33S is the power supply fault abnormality when the auxiliary transmission mechanism 30 is in the neutral state although the second speed is commanded, and to determine that the high clutch/reverse solenoid 33S is the breaking abnormality when the auxiliary transmission mechanism 30 is in the interlocking state although the first speed is commanded.

Besides, the judgment of the gear ratio deviation during the traveling of the vehicle is performed by the gear ratio deviation judging section 127. This gear ratio deviation judgment section 127 is configured to calculate an actual transmission gear ratio from the input and output rotation information of the auxiliary transmission mechanism 30 (the detection information of the secondary rotation speed sensor 42 and the output rotation sensor 43), to judge by comparing the actual transmission gear ratio and the transmission gear ratio of the command shift stage, and thereby to judge whether or not the auxiliary transmission mechanism 30 is in the neutral state or the interlocking state.

Moreover, when both of the low brake 32 and the high clutch 33 become the disengagement state, the auxiliary transmission mechanism 30 becomes the neutral state. The judgment of the neutral state during the stop of the vehicle is performed by the neutral judging section 128. When the vehicle is stopped at the command of the first speed, this neutral judging section 128 is configured to judge the neutral state by the hydraulic pressure being equal to or lower than an extremely low threshold value from the hydraulic pressure information (the detection information of the low brake pressure sensor 55).

Moreover, when the both of the low brake 32 and the high clutch 33 become the engagement state, the auxiliary transmission mechanism 30 becomes the interlocking state. The judgment of this interlocking state during the stop of the vehicle is performed by the interlock judging section 129. At the stop of the vehicle at the command of the first speed, the interlock judging section 129 is configured to judge the interlocking state by the hydraulic pressure being equal to or greater than an extreme high threshold value from the hydraulic pressure information (the detection information of the low brake pressure sensor 55).

On the other hand, the second abnormality judging section 125B is configured to output the OFF command to the solenoid S after the detection of the electric abnormality by the electric abnormality sensing section 122 (that is, after it is judged that the solenoid 32S or 33S (hereinafter referred merely to "S") in which the electric abnormality is sensed is the power supply abnormality or the breaking abnormality), and to judge whether the solenoid valve S is the power supply abnormality or the breaking abnormality.

That is, as shown in FIG. 2(a), the voltage monitoring circuit 121B confirms that the solenoid S is switched to the OFF state. In this OFF state of the solenoid S, the monitoring current value which is monitored by the monitoring section 121 through the monitoring current line 121A is obtained. It is judged whether the solenoid S is the power supply fault abnormality or the breaking abnormality by whether or not the current flows.

As shown in FIG. 2(b), when the electric power supply line to the solenoid S is broken (disconnected), the current does not constantly flow in the solenoid S. Accordingly, even when the OFF command is outputted to the solenoid S, the current does not flow.

On the other hand, when the electric power supply line to the solenoid S is in the power supply fault (short-circuited to the power supply) as shown in FIG. 2(c), the current constantly flows in the solenoid S. Accordingly, even when the OFF command is outputted to the solenoid S, the current flows.

Accordingly, when the OFF command is outputted to the solenoid S, the second abnormality judging section 125B is configured to judge the breaking abnormality when the monitoring current value is equal to or smaller than the breaking threshold value (value near 0), and to judge the power supply fault abnormality when the monitoring current value is equal to or greater than the power supply threshold value (the current value equal to or greater than the predetermined current).

Besides, the second abnormality judging section 125B is configured to output the OFF command to the solenoid S after a predetermined time period (confirmation (check) time period) elapses from the timing of the detection of the electric abnormality, and to judge whether the solenoid valve S is the power supply fault abnormality or the breaking abnormality from the monitoring current value after the predetermined delay time period elapsed from the OFF command.

The predetermined time period relating to the confirmation time period is a time period necessary for the judging operation by the first abnormality judging section 125A. The judgment operation time period by the first abnormality judging section 125A is previously grasped as the processing speed in the ATCU 12. Accordingly, the predetermined time period is previously set. Besides, the predetermined delay time period is a waiting time period after which the monitoring current value becomes stable through the transition state after the OFF command to the solenoid S. The predetermined time period is previously set.

These are for the following reasons. The judgment operation of the second abnormality judging section 125B is performed together with the OFF command to the solenoid S. When the solenoid S is switched to the OFF state, it is not possible to perform the judgment operation of the first abnormality judging section 125A.

Accordingly, the end of the judgment by the first abnormality judging section 125A is waited for so as not to interrupt the judgment operation of the first abnormality judging section 125A.

The judgment operation by the second abnormality judging section 125B often needs time period longer than the judgment operation by the first abnormality judging section 125A. In this case, the judgment operation by the second abnormality judging section 125B is for a case where the first abnormality judging section 125A cannot judge.

Moreover, the ATCU 12 includes a failsafe control section (control means) 130 configured to perform the failsafe control for the solenoid valve in accordance with the judgment result by the failure judgment device.

This failsafe control section 130 is configured to avoid the interlocking and the neutral when the low brake solenoid 32S or the high clutch/reverse brake solenoid 33S is the power supply fault or the breaking fault.

For example, when the low brake valve 32V or the high clutch valve 33V cannot be varied from the disengaged state due to the power supply fault or the breaking fault of the solenoid S, the shift stage of the valve in the normal state is used to avoid the neutral state. When the low brake valve 32V or the high clutch valve 33V cannot be varied from the disengagement state, the shift stage of this valve in the failure state is used to avoid the interlocking.

Figure 3:
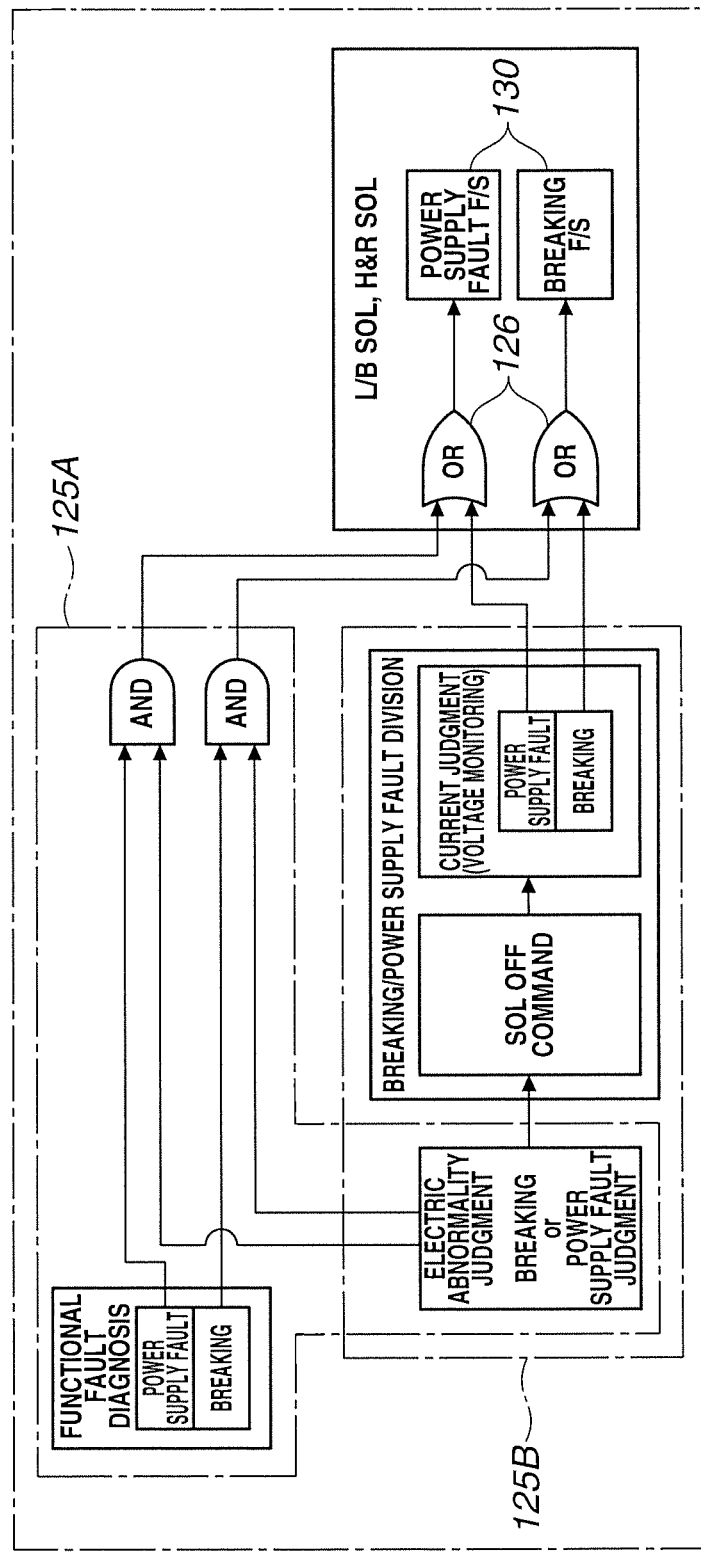
FIG. 3 is a logic circuit diagram for explaining judgment operation by the failure judgment device according to this embodiment of the present invention.

Accordingly, as shown in a logic circuit of FIG. 3, the failure judgment device is configured to judge whether the electric abnormality of the solenoid S is the power supply fault abnormality or the breaking abnormality by the function failure diagnosis by the first abnormality judging section 125A, to output the OFF command to the solenoid S at the timing of the end of this judgment operation, and to judge whether the electric abnormality of the solenoid S is the power supply fault abnormality or the breaking abnormality by the current judgement (with the voltage monitoring) by the second abnormality judging section 125B.

The first abnormality judging section 125A cannot always (necessarily) judge whether the solenoid S is the power supply fault abnormality or the breaking abnormality. However, when the first abnormality judging section 125A can judge that the solenoid S is the power supply fault abnormality or the breaking abnormality, the judgment result is inputted to the output section 126. On the other hand, the second abnormality judging section 125B can surely judge whether the solenoid S is the power supply fault abnormality or the breaking abnormality. The judgment result is outputted to the output section 126.

When the output section 126 receives the judgment result, the output section 126 determines that the solenoid S is the power supply fault abnormality or the breaking abnormality based on this judgment result, and to output this to the failsafe control section 130.

When the judgment result of the first abnormality judging section 125A is previously (antecedently) inputted to the output section 126, the failsafe control section 130 can promptly start the failsafe control without waiting for the second abnormality judging section 125B. When it is not possible to obtain the judgment result of the first abnormality judging section 125A, the judgment result of the second abnormality judging section 125B is inputted to the output section 126. The failsafe control section 130 can surely start the failsafe control.

[Operations and Effects]

The failsafe judgment device of the automatic transmission (the continuously variable transmission) according to this embodiment of the present invention is constituted as described above. Accordingly, for example, as shown by flowcharts of FIG. 5 and FIG. 6, it is possible to perform the failsafe judgment operation. Besides, the flowcharts of FIG. 5 and FIG. 6 are repeated at a predetermined control cycle until the judgment determination.

Figure 5:
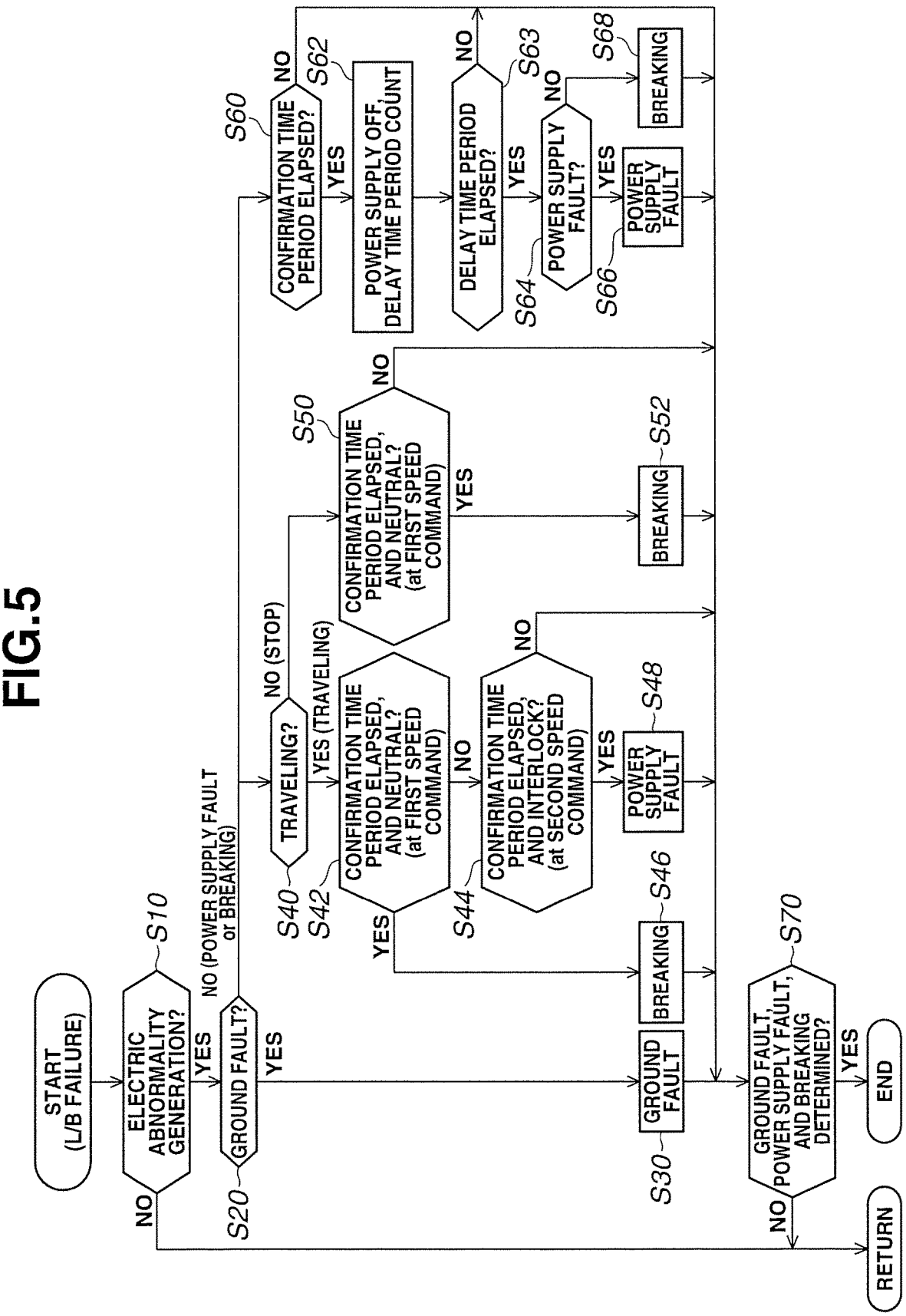
FIG. 5 is a flowchart showing the judgment operation by the failure judgment device according to the present invention.
Figure 6:
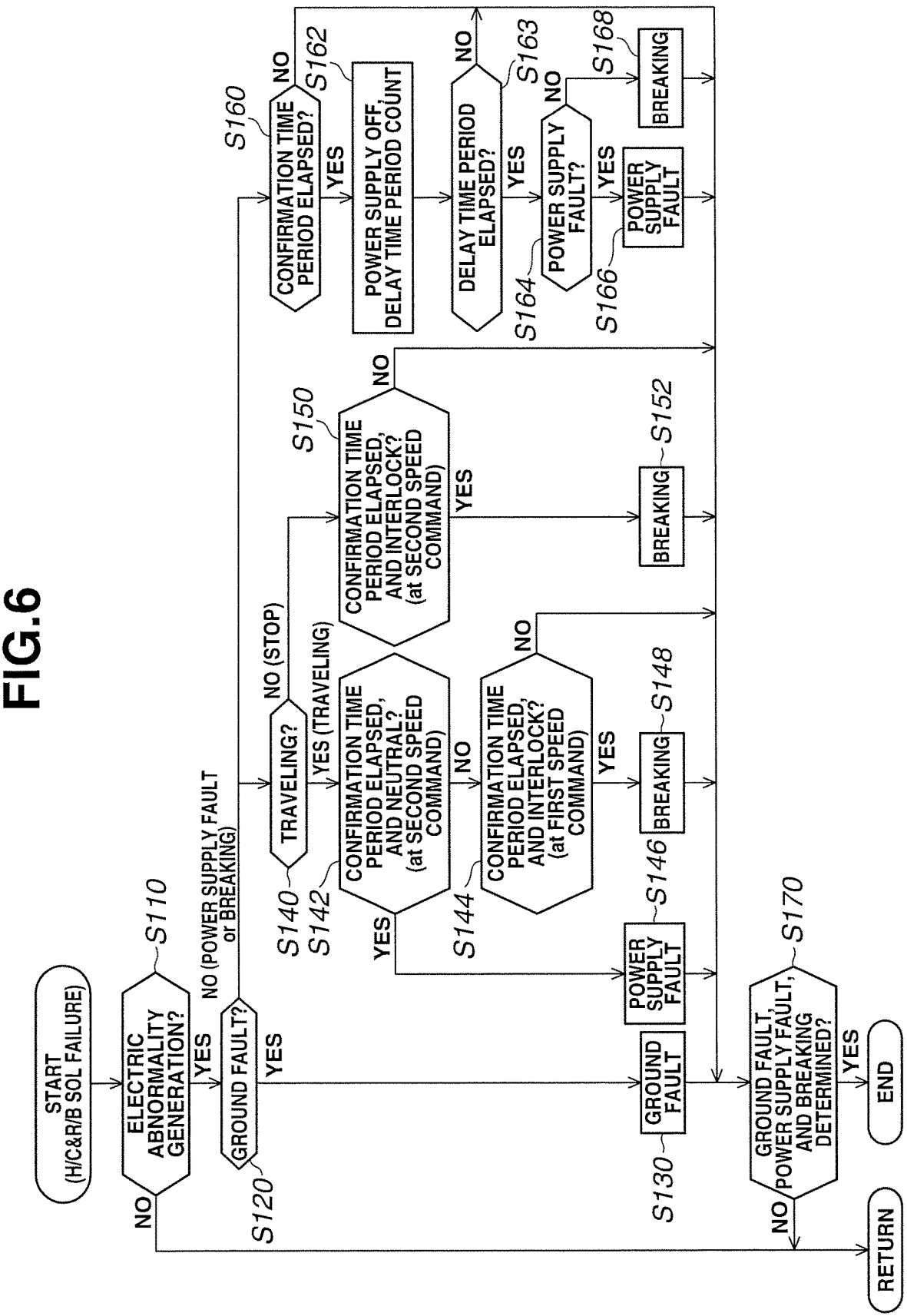
FIG. 6 is a flowchart showing the judgment operation by the failure judgment device according to the present invention.

As shown in FIG. 5, in the failure judgment of the low brake solenoid (LB SOL) 32S, firstly, the electric abnormality sensing section 122 judges whether or not the generation of the electric abnormality of the solenoid 32S is sensed (step S10). When the electric abnormality is not sensed, the process is returned.

When the electric abnormality is generated in the low brake solenoid 32S, the ground fault judging section 124 judges whether or not this electric abnormality is the ground fault abnormality (step S20). When the ground fault abnormality is judged, the ground fault abnormality is determined (step S30). In the determination judgment (step S70) of the ground fault, the power supply fault, and the breaking, the determination of the ground fault abnormality is judged, and the control is finished.

On the other hand, the ground fault judging section 124 judges that the electric abnormality is not the ground fault abnormality, the electric abnormality is the power supply fault or the breaking abnormality. The process proceeds to step S40. The first abnormality judging section 125A performs the judgment by the function failure diagnosis. In parallel with this judgment, the process proceeds to step S60. The second abnormality judging section 125B performs the judgment by the electric current judgment (with the voltage monitoring).

The judgment by the first abnormality judging section 125A firstly judges whether or not the vehicle is traveling (step S40). When the vehicle is traveling, on the precondition of the command of the first speed, the gear ratio deviation section 127 judges whether or not the confirmation time period elapses, and judges whether or not the auxiliary transmission mechanism 30 is in the neutral state (step S42). Besides, the confirmation time period is started to be counted from the timing of the detection of the electric abnormality. When it is judged that the confirmation time period is elapsed by the predetermined time period, the count is finished, and reset to 0.

When the confirmation time period is elapsed and the auxiliary transmission mechanism 30 is in the neutral state, it is determined that the electric abnormality of the low brake solenoid 32S is the breaking abnormality (step S46). In the determination judgment (step S70) of the ground fault, the power supply fault, and the breaking, it is judged that the breaking abnormality is determined, and the control is finished.

When the confirmation time period is elapsed and the auxiliary transmission mechanism 30 is not in the neutral state, on the precondition of the command of the second speed, the gear ratio deviation judging section 127 judges whether or not the confirmation time period is elapsed, and whether or not the auxiliary transmission mechanism 30 is in the interlocking state (step S44).

When the confirmation time period is elapsed and the auxiliary transmission mechanism 30 is in the interlocking state, it is determined that the electric abnormality of the low brake solenoid 32S is the power supply fault abnormality (step S48). In the determination judgment (step S70) of the ground fault, the power supply fault, and the breaking, it is judged that the power supply fault is determined. The control is finished.

When the vehicle is not traveling, the vehicle is during the stop. The first speed is commanded to the auxiliary transmission mechanism 30. The neutral judging section 128 judges whether or not the confirmation time period is elapsed, and whether or not the auxiliary transmission mechanism 30 is in the neutral state (step S50).

When the confirmation time period is elapsed and the auxiliary transmission mechanism 30 is in the neutral state, it is determined that the electric abnormality of the low brake solenoid 32S is the breaking abnormality (step S52). In the determination judgment (step S70) of the ground fault, the power supply fault, and the breaking, it is judged that the breaking abnormality is determined. The control is finished.

The judgment of the second abnormality judging section 125B firstly judges whether or not the confirmation time period is elapsed, that is, whether or not the predetermined time period is elapsed from the control cycle in which the detection of the generation of the electric abnormality (step S10) and the judgment in which the electric abnormality is not the ground fault abnormality (the electric abnormality is the power supply fault abnormality or the breaking abnormality) (step S20) are performed (step S60).

When the confirmation time period is elapsed, the low brake solenoid 32S is switched to the OFF state. That is, the supply of the electric power to the low brake solenoid 32S is shut off. The delay time period is counted (step S62). With this, the elapse of the predetermined delay time period is judged (step S63). It is judged whether or not it is the power supply fault abnormality, that is, whether it is the power supply fault abnormality or the breaking (step S64) by whether or not the current flows in the low brake solenoid 32S. Besides, the count of the delay time period is finished after it is judged that the predetermined delay time period is elapsed after the start of the count. The count is reset to 0.

With this, when the monitoring section 121 senses the current, it is determined that the electric abnormality of the low brake solenoid 32S is the power supply fault abnormality (step S66). In the determination judgment of the ground fault, the power supply fault, and the breaking (step S70), it is judged that the power supply fault is determined. The control is finished.

Moreover, when the monitoring section 121 does not sense the current, it is determined that the electric abnormality of the low brake solenoid 32S is the breaking abnormality (step S68). In the determination judgment of the ground fault, the power supply fault, and the breaking (step S70), it is judged that the breaking abnormality is determined. The control is finished.

In the failure judgment of the high clutch/reverse brake solenoid (H/C & R/B SOL) 33S, as shown in FIG. 6, firstly, the electric abnormality sensing section 122 judges whether or not the generation of the electric abnormality is sensed in the high clutch/reverse brake solenoid 33S (step S110). When the abnormality is not sensed, the process is returned.

When the electric abnormality is generated in the high clutch/reverse brake solenoid 33S, the ground fault judging section 124 judges whether or not this electric abnormality is the ground fault abnormality (step S120). When the ground fault abnormality is judged, the ground fault abnormality is determined (step S130). In the determination judgment (step S170) of the ground fault, the power supply fault, and the breaking, it is judged that the ground fault abnormality is determined. The control is finished.

On the other hand, when the ground fault judging section 124 judges that the electric abnormality is not the ground fault abnormality, the electric abnormality is the power supply fault or the breaking abnormality. Accordingly, the process proceeds to step S140. The function failure diagnosis by the first abnormality judging section 125A is performed. In parallel with this judgment, the process proceeds to step S160. The electric current judgment (with the voltage monitoring) by the second abnormality judging section 125B is performed.

In the judgment of the first abnormality judging section 125A, firstly, it is judged whether or not the vehicle is traveling (step S140). When the vehicle is traveling, on the precondition of the command of the second speed, the gear ratio deviation judging section 127 judges whether or not the confirmation time period is elapsed, and whether or not the auxiliary transmission mechanism 30 is in the neutral state (step S142).

When the confirmation time period is elapsed and the auxiliary transmission mechanism 30 is in the neutral state, it is determined that the electric abnormality of the high clutch/reverse brake solenoid 33S is the power supply fault abnormality (step S146). In the determination judgment of the ground fault, the power supply fault, and the breaking (step S170), it is judged that the power supply fault abnormality is determined. The control is finished.

When the confirmation time period is elapsed and the auxiliary transmission mechanism 30 is not in the neutral state, on the precondition of the command of the first speed, the gear ratio deviation judging section 127 judges whether or not the confirmation time period is elapsed, and whether or not the auxiliary transmission mechanism 30 is in the interlocking state (step S144).

When the confirmation time period is elapsed and the auxiliary transmission mechanism 30 is in the interlocking state, it is determined that the electric abnormality of the high clutch/reverse brake solenoid 33S is the breaking abnormality (step S148). In the determination judgment (step S170) of the ground fault, the power supply fault, and the breaking, it is judged that the breaking abnormality is determined. The control is finished.

When the vehicle is not traveling, the vehicle is stopped. The first speed is commanded to the auxiliary transmission mechanism 30. The interlock judging section 129 judges whether or not the confirmation time period is elapsed, and whether or not the auxiliary transmission mechanism 30 is in the interlocking state (step S150).

When the confirmation time period is elapsed and the auxiliary transmission mechanism 30 is in the interlocking state, it is determined that the electric abnormality of the high clutch/reverse brake 33S is the breaking abnormality (step S152). In the determination judgement of the ground fault, the power supply fault, and the breaking (step S170), it is judged that the breaking abnormality is determined. The control is finished.

In the judgment of the second abnormality judging section 125B, firstly, it is judged whether or not the confirmation time period is elapsed, that is, whether or not the predetermined time period is elapsed from the control cycle in which the detection of the generation of the electric abnormality (step S110) and the judgment (step S120) in which the electric abnormality is not the ground fault abnormality (the electric abnormality is the power supply fault abnormality or the breaking abnormality) are performed (step S160).

When the confirmation time period is elapsed, the high clutch/reverse brake solenoid 33S is switched to the OFF state, that is, the power supply to the high clutch/reverse brake solenoid 33S is shut off. The delay time period is counted (step S162). With this, the elapse of the predetermined delay time period is judged (step S163). It is judged whether or not it is the power supply fault abnormality, that is, whether or not it is the power supply abnormality or the breaking, by whether or not the current flows in the high clutch/reverse brake solenoid 33S (step S164).

With this, when the monitoring section 121 senses the current, it is determined that the electric abnormality of the high clutch/reverse brake solenoid 33S is the power supply fault abnormality (step S166). In the determination judgment (step S170) of the ground fault, the power supply fault, and the breaking, it is judged that the power supply abnormality is determined. The control is finished.

Moreover, when the monitoring section 121 does not sense the current, it is determined that the electric abnormality of the high clutch/reverse brake solenoid 33S the breaking abnormality (step S168). In the determination judgment of the ground fault, the power supply fault, and the breaking (step S170), it is judged that the breaking abnormality is determined. The control is finished.

Figure 4:
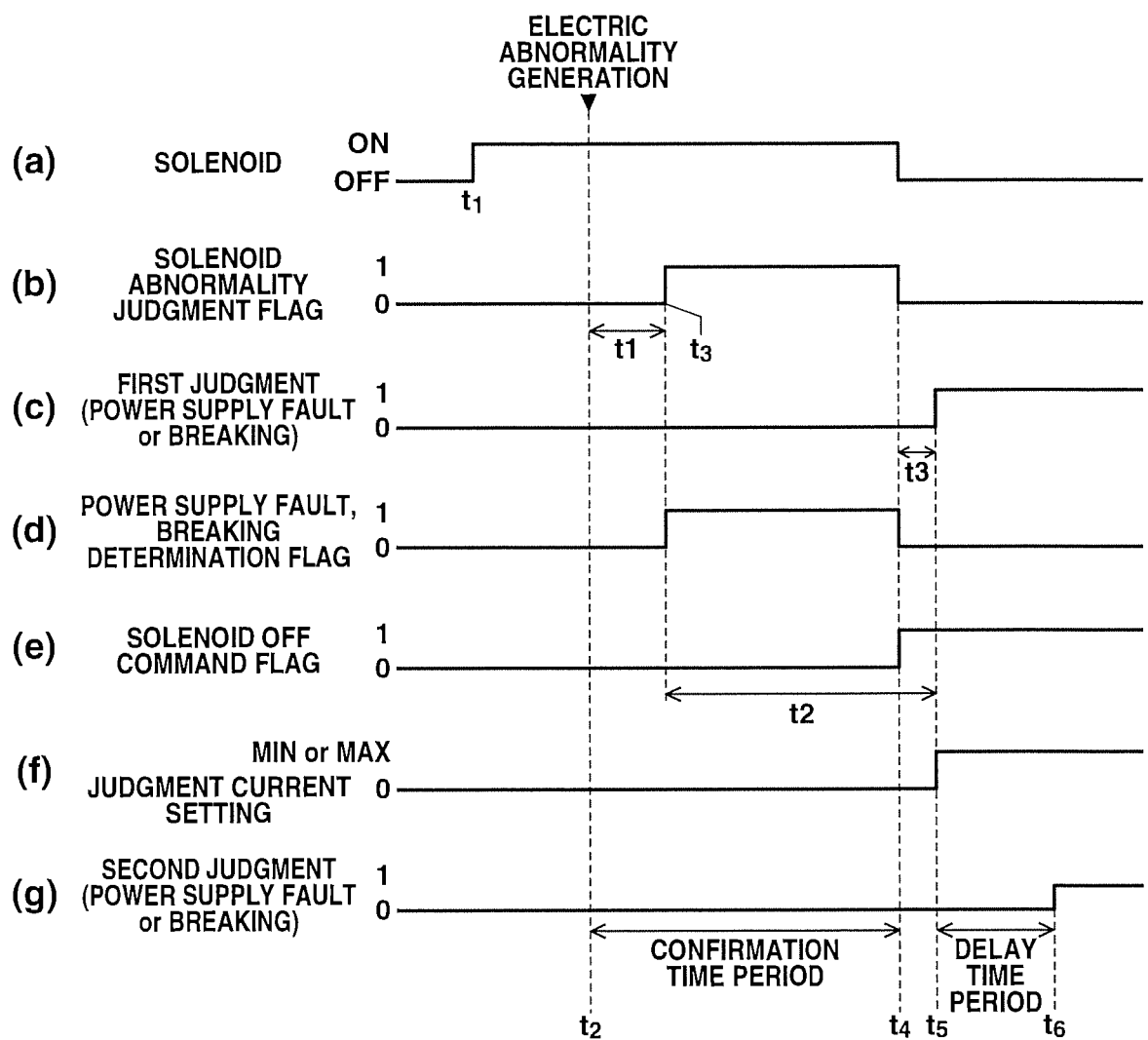
FIG. 4 is a time chart for explaining the judgment operation by the failure judgment device according to the present invention. (a) to (g) of FIG. 4 show, respectively, a state of the solenoid, various flags, and a judgment state.

Next, the judgment operations of the first abnormality judging section 125A and the second abnormality judging section 125B are explained with reference to a time chart of FIG. 4 in time series manner.

At time $t_1$, the ON command is outputted to the solenoid S. At time $t_2$, the electric abnormality of the solenoid S is generated. At time $t_3$ at which the judgment operation time period t1 is elapsed, the electric abnormality sensing section 122 judges the generation of the electric abnormality of the solenoid S. The abnormality judgment flag is set. Moreover, the ground fault judging section 124 judges whether or not the electric abnormality is the ground fault abnormality.

When the ground fault judging section 124 judges that the electric abnormality is not the ground fault abnormality, that is, that the electric abnormality is the power supply fault abnormality or the breaking abnormality, the power supply fault abnormality or breaking abnormality determination flag is set [FIG. 4(d)]. The first abnormality judging section 125A judges whether or not it is the power supply fault abnormality or the breaking abnormality.

At time $t_4$ at which the confirmation time period is elapsed from the time $t_2$ at which the generation of the electric abnormality of the solenoid S is judged, the first abnormality judging section 125A determines the judgment of the power supply fault abnormality or the breaking abnormality. At this timing, the flag of the OFF command to the solenoid S is set [FIG. 4(e)]. The OFF command is outputted to the solenoid S [FIG. 4(a)].

At time $t_5$ of the next cycle after the control cycle $t_3$ is elapsed, the judgment determination flag by the first abnormality judging section 125A is set. The judgment current used for the judgment by the second abnormality judging section 125B is set. That is, the breaking threshold value (MIN) for judging the breaking abnormality, and the power supply fault threshold value (MAX) for judging the power supply fault abnormality are set.

After the OFF command is outputted to the solenoid S at time $t_5$, at time $t_6$ at which the predetermined delay time period (the power supply/breaking judgment wait time period) is elapsed, the judgment by the second abnormality judging section 125B is determined.

In this case, it is possible to obtain the judgment result by the first abnormality judging section 125A at time $t_5$. Accordingly, it is possible to perform the failsafe operation from this timing. However, even when it is not possible to obtain the judgment result by the first abnormality judging section 125A, it is possible to obtain the judgment result by the second abnormality judging section 125B at time $t_6$. Consequently, it is possible to perform the failsafe from this time.

As described above, in the failure judgment device according to this embodiment, the abnormality judgments by the first abnormality judging section 125A and the second abnormality judging section 125B are performed in the parallel with each other. Accordingly, when it is possible to obtain the judgment result of the first abnormality judging section 125A at the earlier stage, it is possible to promptly perform the failsafe operation by the control device according to this embodiment. On the other hand, even when it is not possible to obtain the judgment result by the first abnormality judging section 125A, it is possible to obtain the judgment result of the second abnormality judging section 125B. Consequently, it is possible to surely perform the failsafe process.

That is, the abnormality judgment by the first abnormality judging section 125A is performed based on a specified state of the auxiliary transmission mechanism 30 such as the neutral state and the interlocking state of the auxiliary transmission mechanism 30 in the specified shift stage. When these specified states are not generated, it is not possible to perform the abnormality judgment. However, when the specified state is generated, it is possible to relatively promptly perform the abnormality judgment.

In this embodiment, the OFF command to the solenoid S for the judgment by the second abnormality judging section 125B is outputted after waiting for the time period necessary for the abnormality judgment by the first abnormality judging section 125A. Accordingly, when the above-described state is generated, it is possible to surely obtain the abnormality judgment results by the first abnormality judging section 125A.

On the other hand, the judgment by the second abnormality judging section 125b is performed together with the OFF command of the solenoid S. However, the judgment by the second abnormality judging section 125B does not need the generation of the specified state of the auxiliary transmission mechanism 30. Accordingly, even when the first abnormality judging section 125a cannot determine the abnormality judgment, the second abnormality judging section 125b can determine the abnormality judgment. Consequently, the chance of the judgment is increased. It is possible to appropriately perform the failsafe operation at the failure.

In this way, it is possible to complement demerits of the first abnormality judging section 125A and the second abnormality judging section 125B by the merits of the first abnormality judging section 125A and the second abnormality judging section 125B, by using two abnormality judging sections of the first abnormality judging section 125A and the second abnormality judging section 125B.

[Others]

Hereinabove, the embodiment according to the present invention are explained. However, the present invention is not limited to the above-described embodiment. The present invention may be varied as long as it is not deviated from the gist of the present invention.

For example, in the present invention, the transmission mechanism is the auxiliary transmission mechanism which has a simple type to have the forward two shift stage. However, the present invention is widely applicable to an automatic transmission such as a general stepped transmission.

In case of many stepped transmissions, the shift stage is attained by combination of the engagement/disengagement of the frictional engagement elements. However, when the electric abnormality is generated in the solenoid of the shift valve configured to operate to engage and disengage one of the frictional engagement elements, the specific state such as the neutral state and the interlocking state is generated. Accordingly, the first abnormality judging section can perform the abnormality judgment based on this.

Moreover, the second abnormality judging section does not need the above-described specific state. Accordingly, the second abnormality judging section is widely applicable to the judgment of the cause of the electric abnormality of the solenoid of the shift valve of the transmission mechanism of the automatic transmission for the vehicle.

Moreover, in the above-described embodiment, the first abnormality judging section is configured to refer to the various specific state such as the neutral state and the interlocking state, and to judge the cause of the electric abnormality of the solenoid. However, the first abnormality judging section may be refer to a part of these specific states, and thereby to judge the cause of the electric abnormality of the solenoid.

The invention claimed is:

1. A failure judgment device of an automatic transmission for a vehicle which includes a transmission mechanism including a frictional engagement element arranged to be engaged in accordance with a selected shift stage, a solenoid valve arranged to control an engagement state of the frictional engagement element, the failure judgment device comprising:
a control unit configured to:
monitor a current value which is an electrical value of current supplied to the solenoid valve;
sense a generation of an electric abnormality of the solenoid valve from the monitored current value which is different from a command current value to the solenoid valve;
judge a power supply fault abnormality which is a short circuit to a power supply, or a breaking abnormality, which is a disconnection, of the solenoid valve, from the selected shift stage and a state of the transmission mechanism, after a detection of the generation of the electric abnormality;
judge the power supply fault abnormality or the breaking abnormality, from the monitored current value when the solenoid valve is switched to an OFF state, after the detection of the generation of the electric abnormality, and
output a judgement result when the power supply fault abnormality or the breaking abnormality is judged from one of (i) the selected shift state and the state of the transmission mechanism or (ii) the monitored current value.

2. The failure judgment device for the automatic transmission of the vehicle as claimed in claim 1, wherein the control unit is configured to start a judgment of the power supply fault abnormality or the breaking abnormality of the solenoid valve from the monitored current value after a predetermined time period necessary for the judgment from the selected shift state and the state of the transmission mechanism is elapsed from the detection of the generation of the electric abnormality.

3. The failure judgment device for the automatic transmission of the vehicle as claimed in claim 1, wherein the control unit is configured to judge the power supply fault abnormality or the breaking abnormality of one of a plurality of solenoid valves, from a gear ratio deviation between an actual gear ratio and a gear ratio by a shift stage commanded to the transmission mechanism.

4. The failure judgment device for the automatic transmission of the vehicle as claimed in claim 1, wherein
the automatic transmission includes a plurality of solenoid valves; and
the control unit is configured to
judge whether one of the plurality of the solenoid valves has the power supply fault abnormality or the breaking abnormality when the transmission mechanism is brought to a neutral state during a vehicle stop when a traveling range is selected; and
judge whether or not another of the plurality of the solenoid valves has the power supply fault abnormality or the breaking abnormality when the transmission mechanism is brought to an interlocking state when the vehicle is traveling.

5. The failure judgment device for the automatic transmission of the vehicle as claimed in claim 1, wherein the control unit is further configured to judge that one of the solenoid valves has a ground fault abnormality which is a short circuit to ground when the monitored current value is equal to or greater than a predetermined current value when the electric abnormality is sensed, and judge whether or not the solenoid valve has the power supply fault abnormality or the breaking abnormality when the monitored current value is smaller than the predetermined current value when the electric abnormality is sensed; and judge the power supply fault abnormality or the breaking abnormality from one of (i) the selected shift state and the state of the transmission mechanism or (ii) the monitored current value when the monitored current value is smaller than the predetermined current value when the electric abnormality is sensed.

6. A control device for an automatic transmission of a vehicle which includes a transmission mechanism including frictional engagement element arranged to be engaged in accordance with a selected shift stage, and a solenoid valve arranged to control the engagement state of the frictional engagement element, the control device comprising:

a failure judgement device including
a control unit configured to
monitor a current value which is an electrical value of current supplied to the solenoid valve;
sense a generation of an electric abnormality of the solenoid valve from the monitored current value which is different from a command current value to the solenoid valve;
judge a power supply fault abnormality which is a short circuit to a power supply, or a breaking abnormality, which is a disconnection, of the solenoid valve, from the selected shift stage and a state of the transmission mechanism, after a detection of the generation of the electric abnormality; and
judge the power supply fault abnormality or the breaking abnormality of the solenoid valve, from the monitored current value when the solenoid valve is switched to an OFF state, after the detection of the generation of the electric abnormality,
wherein the failure judgement device is configured to output a judgement result when the power supply fault abnormality or the breaking abnormality is judged from one of (i) the selected shift state and the state of the transmission mechanism or (ii) the monitored current value, and
wherein the control unit is configured to perform a failsafe of the solenoid valve in accordance with the judgment result of the failure judgment device.

7. The control device as claimed in claim 6, wherein the control unit is configured to start a judgment of the power supply fault abnormality or the breaking abnormality of the solenoid valve from the monitored current value after a predetermined time period necessary for the judgment from the selected shift state and the state of the transmission mechanism is elapsed from the detection of the generation of the electric abnormality.

8. The control device as claimed in claim 6, wherein the control unit is configured to judge the power supply fault abnormality or the breaking abnormality of one of a plurality of solenoid valves, from a gear ratio deviation between an actual gear ratio and a gear ratio by a shift stage commanded to the transmission mechanism.

9. The control device as claimed in claim 6, wherein
the automatic transmission includes a plurality of solenoid valves;
the control unit is configured to judge whether one of the plurality of the solenoid valves has the power supply fault abnormality or the breaking abnormality from the monitored current value when the transmission mechanism is brought to a neutral state during a vehicle stop when a traveling range is selected; and
the control unit is configured to judge whether or not another of the plurality of solenoid valves has the power supply fault abnormality or the breaking abnormality from the selected shift state and the state of the transmission mechanism when the transmission mechanism is brought to an interlocking state when the vehicle is traveling.

10. The control device as claimed in claim 6, wherein
the failure judgment device is configured to judge that one of the solenoid valves has a ground fault abnormality which is a short circuit to ground when the monitored current value is equal to or greater than a predetermined current value when the electric abnormality is sensed, and judge whether or not the solenoid valve has the power supply fault abnormality or the breaking abnormality when the monitored current value is smaller than the predetermined current value when the electric abnormality is sensed; and
the control unit is configured to judge the power supply fault abnormality or the breaking abnormality when the monitored current value is smaller than the predetermined current value when the electric abnormality is sensed.

* * * * *